(12) United States Patent
Andre et al.

(10) Patent No.: US 8,464,541 B2
(45) Date of Patent: Jun. 18, 2013

(54) CLOSING SYSTEM FOR AN AIRCRAFT FAN SHROUD

(75) Inventors: Robert Andre, Lacroix Flagarde (FR); Loic Dussol, Toulouse (FR); Frederic Ridray, L'Isle Jourdain (FR)

(73) Assignee: Airbus Operations SAS, Toulouse (FR)

( * ) Notice: Subject to any disclaimer, the term of this patent is extended or adjusted under 35 U.S.C. 154(b) by 770 days.

(21) Appl. No.: 12/629,674

(22) Filed: Dec. 2, 2009

(65) Prior Publication Data
US 2010/0192540 A1  Aug. 5, 2010

(30) Foreign Application Priority Data

Dec. 4, 2008 (FR) ..................... 08 58277

(51) Int. Cl.
*F02C 7/20* (2006.01)
(52) U.S. Cl.
USPC .......................... 60/796; 244/53 R
(58) Field of Classification Search
CPC ........................................ F23R 3/60
USPC .................. 60/226.1, 796, 797, 798; 244/54, 244/129.4, 53 R, 129.5, 131, 1 N
See application file for complete search history.

(56) References Cited

U.S. PATENT DOCUMENTS

| | | | |
|---|---|---|---|
| 2,771,063 A | 11/1956 | Skistimas | |
| 5,157,915 A * | 10/1992 | Bart | 60/797 |
| 5,239,822 A | 8/1993 | Buchacher | |
| 5,941,061 A * | 8/1999 | Sherry et al. | 60/798 |
| 7,204,458 B2 * | 4/2007 | Porte et al. | 244/129.4 |

FOREIGN PATENT DOCUMENTS

| | | |
|---|---|---|
| EP | 0453360 A1 | 10/1991 |
| GB | 2259954 A | 3/1993 |

OTHER PUBLICATIONS

French Search Report dated Jun. 25, 2009.

* cited by examiner

*Primary Examiner* — Andrew Nguyen
(74) *Attorney, Agent, or Firm* — Perman & Green, LLP

(57) ABSTRACT

A closing system for a fan cowling on a jet engine of an aircraft that has at least one assembly including a male contrivance integral with the cowling, and a female contrivance integral with the jet engine that has a lower element forming at least one first guide ramp and an upper element forming at least one second guide ramp, with the aforementioned female contrivance being suitable on the one hand for guiding the male contrivance during the opening and/or the closing of the fan cowling, and on the other hand providing a limitation of the radial and circumferential displacements of the male contrivance.

9 Claims, 3 Drawing Sheets

CLOSING SYSTEM FOR AN AIRCRAFT FAN SHROUD

CROSS-REFERENCE TO RELATED APPLICATIONS

This application claims priority to and the benefit of French Application No. 08 58277 filed on 04 Dec. 2008, the disclosures of which are incorporated by reference in its entirety.

SUMMARY

The aspects of the disclosed embodiments relate to a system for closing a fan cowling mounted around an aircraft jet engine.

The disclosed embodiments find applications in the field of aircraft jet engine protection, in particular in the field of access to the jet engines through cowlings hinged directly or indirectly to the masts supporting the jet engines.

In an aircraft jet engine, for example a double-flow jet engine, maintenance is generally provided for by opening two pivoting cowlings at least partially surrounding the jet engine.

FIG. 1 shows an example of a four-engined jet aircraft, only two of whose jet engines 1a, 1b are visible. FIG. 2 shows schematically an example of a jet engine. A jet engine generally has an air inlet structure, a compressor module (fan cowling in English), and at least one thrust reverser. The jet engine 1 is installed in a nacelle 5 generally fastened to the wing 6 through a mast 7. The nacelle 5 is mounted along the longitudinal axis of the aircraft.

The pivoting cowlings 3, called fan cowlings, are an integral part of the nacelle 5. These fan cowlings 3 are intercalated between the air inlet structure 4, forming the front of the nacelle (in the direction of flow of the air) and a rear section 2 of the nacelle, in which the thrust reversers are generally housed. Accordingly, they are essentially positioned around the compressor module.

Accordingly, the compressor module is surrounded by two cowlings made of two panels whose transverse cross section has essentially the shape of a crescent. Each of these fan cowlings is hinged around hinges mounted on both sides of the jet engine mast, parallel to the axis of the jet engine.

Opening the fan cowlings allows the maintenance personnel to have access to the elements related to the jet engine. When they are closed, the cowlings provide the nacelle with exterior aerodynamic continuity.

Closing of the cowlings is generally assured by an axial blocking system at the top of the cowling and by means of locks of the hook lock type, at the bottom of the cowling. These locks join the lower edges of the two cowlings, in other words the edges of the cowlings facing one another. When the fan cowlings are unlocked, it is possible to open them by tilting them toward the outside and upward from below the jet engine.

When the cowlings are closed, an alignment system located at the bottom of the cowlings guarantees that the two cowlings are well aligned. Once they are aligned, the cowlings are locked by the hook locks.

With such fan cowlings and such a closing system for the cowlings, it is found that in some aircraft models there is a deflection of the fan cowling at the air inlet. This deflection can be of the order of 20 mm. It should be pointed out that this deflection is found essentially from the side opposite the fuselage of the aircraft, in other words in the exterior section of the nacelle, especially because of aerodynamic forces.

FIG. 3 shows schematically the right and left nacelles of an aircraft, with the misalignment of the cowlings, in broken lines, essentially at the exterior sides of the nacelles.

Such a deflection entails misalignments at the junction between the air inlet structure and the cowling. These misalignments can cause a scooping of air phenomenon, in other words the entry of air beneath the cowling that then perturbs the external streamlining of the nacelle and the ventilation of the internal area at the cowling, entailing losses of the aerodynamic performance of the aircraft. FIG. 4 shows schematically the scooping phenomenon consequent to a misalignment of a fan cowling.

Significant scooping consequent to significant misalignment can even have the effect of pressurizing the internal faces of the cowling, which lifts under the action of this pressure, causing damage to the cowling even up to the loss of said cowling.

In other respects, a substantial misalignment can cause vibrations; relative motions due to the scooping can disconnect the hook locks and thus endanger the integrity of the locking function of said hooks.

The precise purpose of the disclosed embodiments is to correct the drawbacks of the techniques described above. To this end, the disclosed embodiments propose a system to limit the relative and circumferential displacements in flight between the fan cowling and the air inlet structure, which incorporates ramps to facilitate the closing of the cowling.

More precisely, the disclosed embodiments relate to a system for closing a fan cowling on an aircraft jet engine, wherein it has at least one assembly composed of:
- a male contrivance integral with the cowling, and
- a female contrivance integral with the jet engine that has a lower element forming at least a first guide ramp and an upper element forming at least a second guide ramp, with said female contrivance being able to provide guidance for the male contrivance during the opening and/or closing of the fan cowling on the one hand, and on the other hand a limitation of the radial and circumferential displacements of the male contrivance.

The fan cowling closing system of the disclosed embodiments can have one or more of the following characteristics:
- the male contrivance has a base fastened to the cowling and a hooked finger that can slide along the guide ramps of the female contrivance.
- the hooked finger has the shape of a half U, with a foot perpendicular to the base and a leg forming an angle between 90° and 180° with the foot.
- the first ramp of the lower element is parallel to a lower face of the leg of the hooked finger, assuring a radial positioning of said hooked finger.
- the upper element has essentially the shape of a boomerang with two faces joined by an elbow.
- one of the faces facing the first guide ramp of the lower element forms the second guide ramp and assures a circumferential positioning of the hooked finger, and the other face forms a third guide ramp essentially parallel to the cowling when it is in the closed position and assuring guidance for the hooked finger during the closing of the cowling.
- it has an adjustable clearance on the one hand between the lower element and the hooked finger, and on the other hand between the hooked finger and the upper element.
- the lower element and the upper element are fastened to an air inlet structure of the jet engine.

The disclosed embodiments also relate to a nacelle of an aircraft jet engine that has at least one closing system as described above.

The disclosed embodiments also relate to an aircraft that has such a closing system.

DETAILED DESCRIPTION

Figure 5:
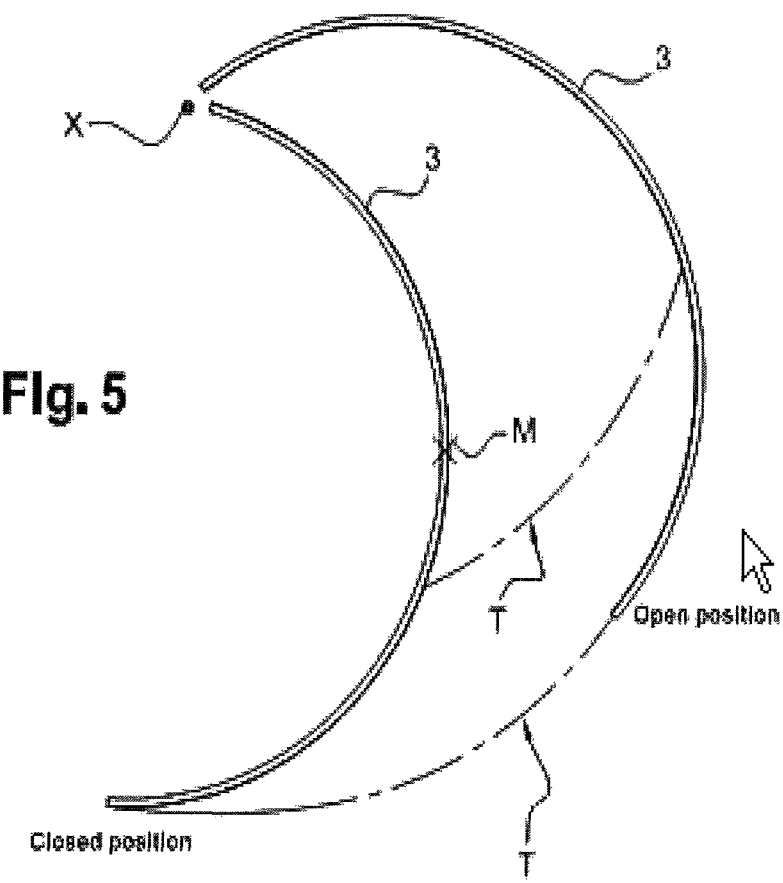
FIG. 5 shows a cross sectional view of a fan cowling in a closed position and in an open position.

FIG. 5 shows a cross sectional view of a fan cowling in a closed position and in an open position. As shown in this figure, the cowling 3 has a cross section essentially in the shape of a crescent or a half-ring. The cowling 3 is hinged around an axis of rotation X formed by the hinges placed along the jet engine mast.

In FIG. 5, the cowling 3 has been shown in its closed position, that is to say when it surrounds half of the compressor module of the jet engine. The cowling 3 has also been shown in its open position providing access to the jet engine. Opening the cowling 3 then permits maintenance personnel to access the jet engine itself and the surrounding systems.

The cowling 3 is opened manually by the maintenance personnel. It is opened by unlocking the locking mechanism and then raising and tilting the cowling around the axis of rotation X. The trajectory T of displacement of the cowling 3 between its closed position and its opened position has been shown in this figure by broken lines. As explained above, the kinematic axis of rotation for opening the cowling is a hinged line along the jet engine mast. This hinged line can be composed of one or more hinges mounted on the front part of the jet engine mast.

As will be seen in more detail below, the fan cowling closing system of the disclosed embodiments allows these kinematics of opening the cowling to be respected.

Figure 6:
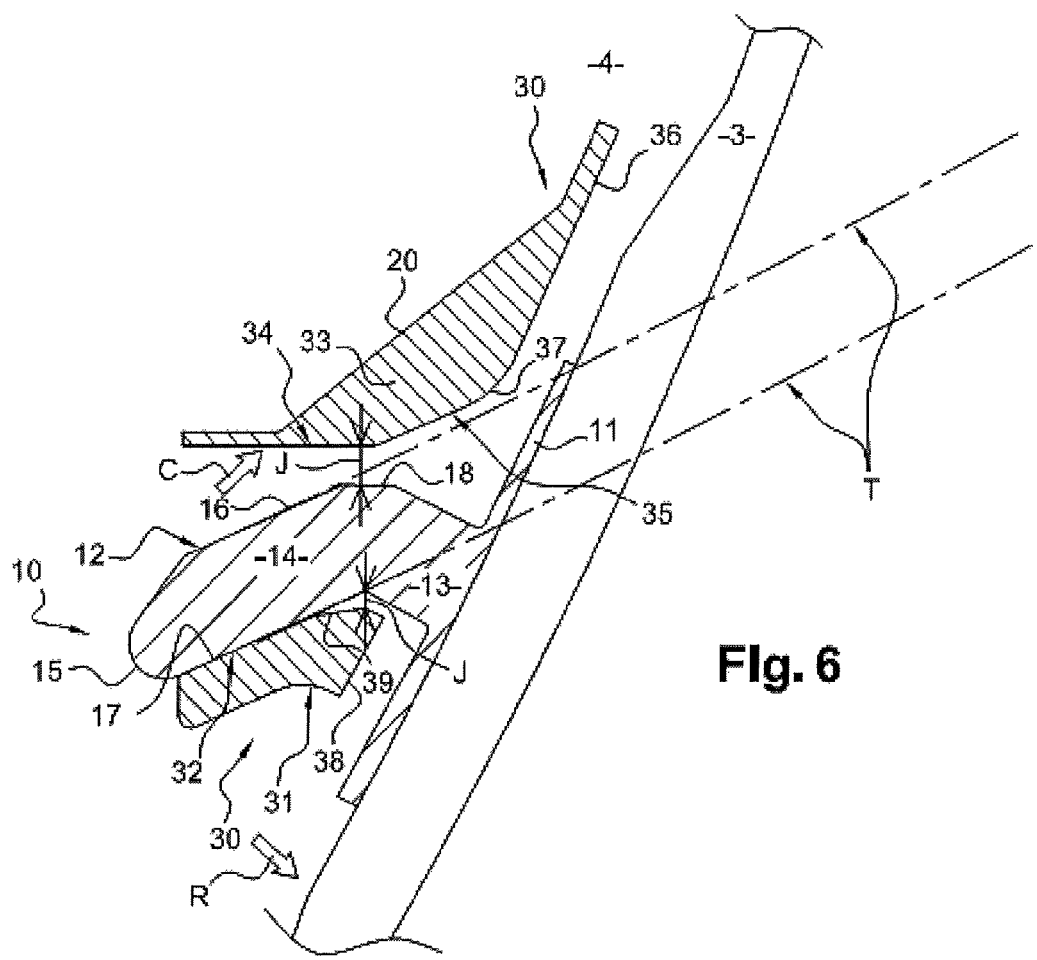
FIG. 6 shows a fan cowling closing system pursuant to the disclosed embodiments.

In FIG. 6, the fan cowling closing system according to the disclosed embodiments has been shown in further detail. As shown in this figure, the system of the disclosed embodiments has a male contrivance 10 integral with the cowling 3, and a female contrivance 30 integral with the jet engine. The male contrivance 10 is fastened to the cowling 3. The female contrivance 30 is fastened to the air inlet structure 4. The male contrivance is intended to be inserted in the female contrivance when the cowling is closed, which then assures a radial and circumferential positioning of the male contrivance to avoid or at least limit the misalignment of the cowling.

The male contrivance 10 is composed of a base 11 fastened to the cowling 3 by traditional fasteners such as rivets, and a hooked finger 12 that can be introduced into the female contrivance 30.

The female contrivance 30 has an upper element 33 and a lower element 31, between which the hooked finger 12 is introduced during the closing of the cowling. the lower element 31 has the shape of an inverted half V comprising a base 38 parallel to the base 11 of the male contrivance, a face 32 forming a first guide ramp for the hooked finger, and a face 39 connecting the base 38 and the face 32. This first ramp 32 has the role of guiding the hooked finger 12 during the closing of the cowling and of assuring a radial positioning of said hooked finger. In other words, this ramp 32 prevents the hooked finger 12 from moving radially, following the arrow R, when the cowling is in the closed position. The face 39 constitutes the first guide ramp in case of a deflection of the cowling.

The upper element 33 has an exterior shape resembling that of a boomerang. More precisely, this boomerang shape has a first exterior face 36 and a second exterior face 35 connected by an elbow 37; the interior face 20 can have a varied shape, straight as shown in FIG. 6 or curved. The first face 36 forms a second guide ramp for the hooked finger. The second face 35 forms a third guide ramp for the hooked finger.

The ramp 34 is horizontal. It provides for a circumferential positioning of the hooked finger 12. As will be seen in more detail below, this ramp 34 is a ramp to limit displacement, in other words it prevents the hooked finger 12 from moving circumferentially along the arrow C when the cowling is in the closed position.

According to an embodiment of the disclosed embodiments, the hooked finger 12 has the shape essentially of an inverted half U. It has a foot 13 perpendicular to the base 11, and a leg 14 that forms an angle between 90° and 180° with the foot. In the example of FIG. 6, the leg 14 and the foot 13 form an angle of approximately 135°. The angle between the leg 14 and the foot 13 is able to interlock around the half V of the lower element, while providing a clearance whose role will be described later.

The leg 14 of the hooked finger 12 has a first face 17 facing the first ramp 32 of the lower element, and a second face 16 parallel to this first face 17 facing the ramp 34 of the upper element. The end of the leg 14 opposite the foot 13 is preferably rounded or partially rounded to facilitate the introduction of the hooked finger 12 between the lower and upper elements 31 and 33, respectively.

In a preferred embodiment of the disclosed embodiments, the upper angle between the foot 13 and the leg 14 of the hooked finger 12 is truncated, thus forming a face 18 between the face 16 and the foot 13.

Figure 4:
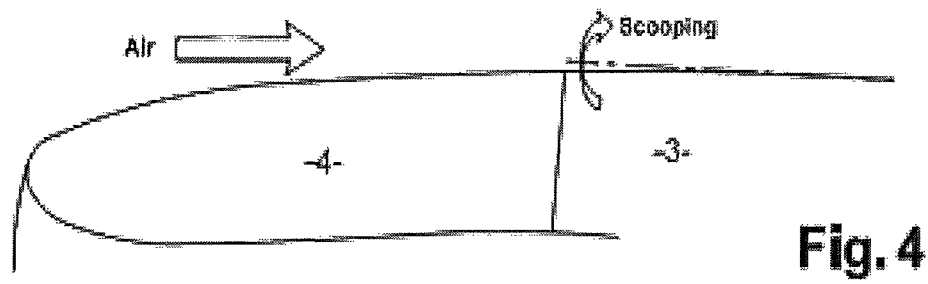
FIG. 4 shows schematically a scooping phenomenon in a fan cowling.

It can be understood from what has been said, that during the opening of the cowling 3, the hooked finger 12 slides along the ramp 32 of the lower element and then along the elbow 37 of the ramp 35 of the upper element. This sliding of the hooked finger 12 between the upper and lower elements 33 and 31, respectively, assures the kinematics of the opening of the cowling shown in FIG. 4.

During the closing of the cowling 3, the hooked finger 12 slides along the elbow 37 (depending on its position due to the geometric tolerances) and the ramp 32 (or the ramps 39 and then 32, depending on its position due to the geometric tolerances). The hooked finger 12 stops sliding when the cowling comes into contact with the opposite cowling, closing the fan cowling, at the vertical of the mast 7.

When the hooked finger 12 is completely inserted in the female contrivance 30, the cowling 3 can be locked to the jet engine by traditional means of locking. Once the cowling 3 is locked, the shape itself of the hooked finger 12 and of the upper and lower elements 33 and 31, respectively, prevent or at least limit the circumferential motions and the radial motions of the hooked finger, and consequently the circumferential and radial motions of the cowling. This limitation of the motions of the hooked finger, in particular the radial motions, allows a limitation of, the misalignment of the cowling relative to the air inlet structure, or even prevents it, thus preventing the scooping phenomenon.

In a preferred embodiment of the disclosed embodiments, two clearances, represented in FIG. 6 by double arrows J, allow an adjustment of the dimension of the spaces between the base 18 of the hooked finger and the ramp 34 of the upper element, and between the face 39 of the lower element and the foot 13 of the hooked finger. These clearances J are defined so as to obtain a compromise between the ease of insertion of the hooked finger in the female contrivance and the limitation of circumferential and radial motions. It should be understood that these clearances are adjustable only during the setup of the closing system. Once the clearances are defined, the upper element and the lower element are fastened to the air inlet structure. The circumferential and radial motion clearances can then not be modified.

The female contrivance and the male contrivance of the system of the disclosed embodiments can of course have forms different from those that have just been described. The forms described correspond to an example of embodiment; other forms of the male contrivance and of the female contrivance can provide for a limitation of the radial and circumferential displacements of the fan cowling.

Figure 1:
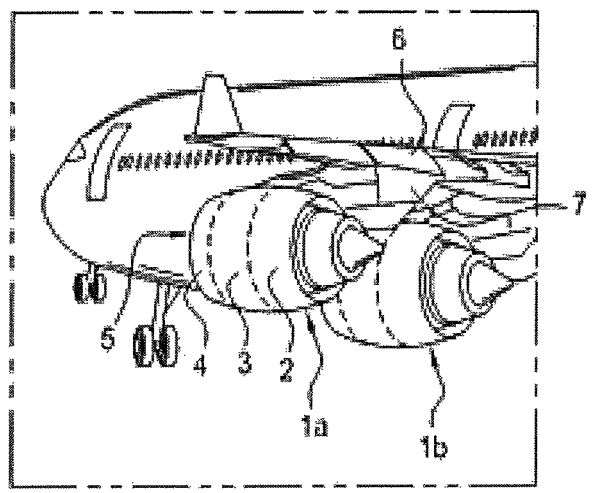
FIG. 1, already described, shows a side view of an aircraft with several nacelles.
Figure 2:
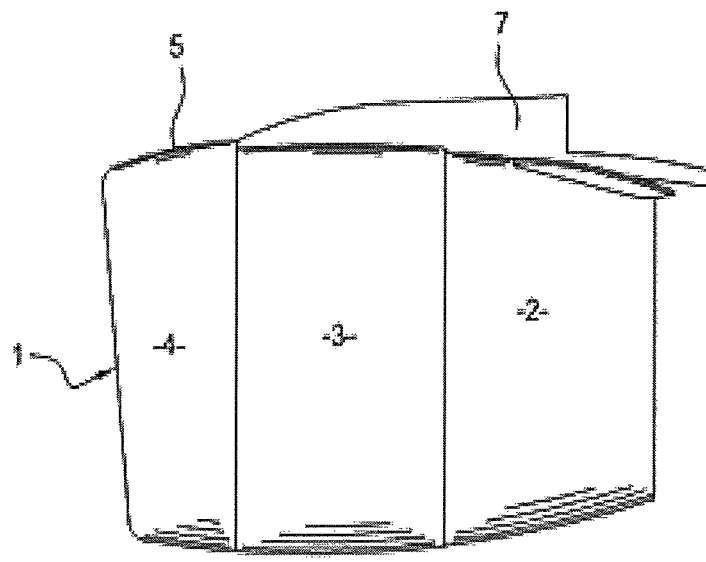
FIG. 2 shows schematically an aircraft nacelle with its fan cowling.
Figure 3:
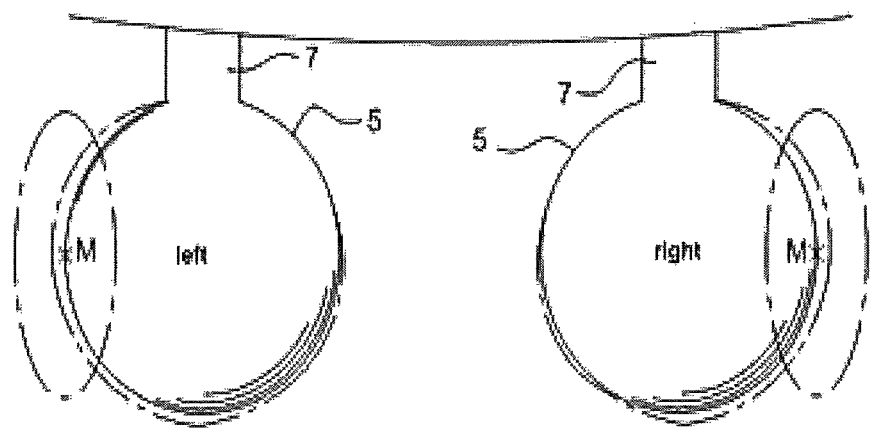
FIG. 3 shows schematically a cross sectional view of two nacelles with their respective misalignment.

The assembly composed of the female contrivance and the male contrivance as shown in FIG. 6 is mounted on the two sides of the nacelle. It is mounted at the place on the cowling where the misalignment in this system would be the greatest. In the examples of FIGS. 3 and 5, it would be placed essentially in the middle of the cross section of the cowling, at the position labeled M.

In an embodiment of the disclosed embodiments, the closing system has an assembly composed of a female contrivance and a male contrivance on each side of the nacelle, i.e. the exterior side and the interior side.

The invention claimed is:

1. An aircraft nacelle with a system for closing a fan cowling on a jet engine of the aircraft, the system comprising:
    at least one assembly mounted on one side of the nacelle, the at least one assembly comprising:
    a male contrivance integral with the cowling, and
    a female contrivance integral with the jet engine, the female contrivance comprising:
    a lower element forming at least one first guide ramp and an upper element forming at least one second guide ramp, the first guide ramp providing a radial displacement limitation of the male contrivance and the second guide ramp providing a circumferential displacement limitation of the male contrivance when the cowling moves outward from the engine,
    wherein the male contrivance comprises a first face facing the first guide ramp and a second face parallel to the first face, the second face facing the second guide ramp, when the male contrivance is disposed between the upper element and the lower element, and wherein the first guide ramp and the second guide ramp prevent scooping of the cowling.

2. An aircraft nacelle according to claim 1, wherein the male contrivance has a base fastened to the cowling and a hooked finger able to slide along the guide ramps of the female contrivance.

3. An aircraft nacelle according to claim 2, wherein the hooked finger has the shape of a half U, and has a foot perpendicular to the base and a leg forming an angle between 90° and 180° with the foot.

4. An aircraft nacelle according to claim 3, wherein the first face of the male contrivance comprises a lower face of the leg of the hooked finger, and wherein the first ramp of the lower element is essentially parallel to the lower face of the leg of the hooked finger, assuring a radial positioning of said hooked finger.

5. An aircraft nacelle according to claim 1, wherein the upper element has essentially a shape of a boomerang comprising upper element faces connected by an elbow.

6. An aircraft nacelle according to claim 2, wherein the upper element comprises a third guide ramp essentially parallel to the cowling when in a closed position, and providing guidance for the hooked finger during opening and closing of the cowling.

7. An aircraft nacelle according to claim 2, comprising an adjustable clearance between the lower element and the hooked finger, and an adjustable clearance between the hooked finger and the upper element.

8. An aircraft nacelle according to claim 1, wherein the lower element and the upper element are fastened to an air inlet structure of the jet engine.

9. An aircraft comprising the nacelle equipped with the closing system according to claim 1.

* * * * *